United States Patent [19]

Jacquel

[11] Patent Number: 4,612,438
[45] Date of Patent: Sep. 16, 1986

[54] LIGHT INTENSITY SENSOR PROVIDING A VARIABLE OUTPUT CURRENT

[75] Inventor: Dominique Jacquel, Marnaz, France
[73] Assignee: Somfy, France
[21] Appl. No.: 575,841
[22] Filed: Jan. 31, 1984
[30] Foreign Application Priority Data
 Feb. 4, 1983 [FR] France .................. 83 01759
[51] Int. Cl.⁴ ............................................ H01J 40/14
[52] U.S. Cl. .............................. 250/206; 250/214 A; 307/311
[58] Field of Search ............... 250/206, 214 R, 214 A; 307/311

[56] References Cited
U.S. PATENT DOCUMENTS

| | | | |
|---|---|---|---|
| 3,443,101 | 5/1969 | Bockemuehl | 250/206 |
| 4,176,288 | 11/1979 | Komatsu et al. | 307/311 |
| 4,262,220 | 4/1981 | Delacruz | 307/311 |
| 4,424,440 | 1/1984 | Youmans | 250/206 |
| 4,479,052 | 10/1984 | Suzuki | 250/214 R |

*Primary Examiner*—Edward P. Westin
*Attorney, Agent, or Firm*—Darby & Darby

[57] ABSTRACT

A light intensity sensor includes a variable-voltage opto-electronic generator adapted to deliver to the terminals of a load resistor a voltage varying as a function of the variable light intensity detected by the sensor. A reference voltage generator is connected in series to the non-inverting input terminal of an electronic voltage comparator. One terminal of the opto-electronic generator, which is also and output terminal of the sensor, is connected via a loop resistor to the inverting input terminal of the electronic voltage comparator. The output terminal of the comparator is connected to the input terminal of a current amplifier fed from an external voltage source via the other output terminal of the sensor. The output of this amplifier is connected to the inverting input terminal of the electronic voltage comparator. The sensor provides an output current that varies as a function of the variable voltage generated by the variable-voltage opto-electronic generator.

1 Claim, 1 Drawing Figure

LIGHT INTENSITY SENSOR PROVIDING A VARIABLE OUTPUT CURRENT

BACKGROUND OF THE INVENTION

Field of the Invention

The present invention relates to light intensity sensors of the type comprising a variable-voltage opto-electronic generator adapted, as a function of the variable light intensity picked up by the sensor, to deliver a variable voltage to the terminals of a load resistor.

Conventional sensors of this type display some advantageous features in connection with the use of a variable-voltage opto-electronic sensor. However, such conventional sensors are disadvantageous for a number of reasons. First, the voltage available across their output terminals is usually affected by line resistances and also by radioelectric interferences from the main power lines. Second, the output terminals are usually polarized so that inadvertently connecting the conventional circuits to a power supply of reversed polarity may damage the sensor, and in particularly, the opto-electronic generator used in the sensor. Third, this variable voltage is extremely low, in the order of 0.5 V, for example, so that it is not possible to include in such a sensor a diode bridge to eliminate the polarization of its terminals. In fact, a diode bridge would by itself cause a voltage drop of about 1.2 V, which is inconsistent with the 0.5 V voltage available across the output terminals of the conventional sensor. Furthermore, the very low voltage obtained across the sensor output terminals can only be measured by using very sensitive and, therefore, expensive instruments. Fourth, when the light intensity received by a conventional sensor is zero, the sensor does not deliver any quiescent or "rest" current and it is not possible, unless additional apparatus are used, to know at any time if the electrical connection between the sensor and the measuring instrument is broken or not.

OBJECT AND SUMMARY OF THE INVENTION

The sensor according to the present invention is characterized by the fact that it comprises a reference voltage generator connected in series with the variable-voltage opto-electronic generator via a first terminal common to both voltage generators. The second terminal of the reference voltage generator is connected to the non-inverting input terminal of an electronic voltage comparator. The second terminal of the variable-voltage opto-electronic generator, which constitutes the first output terminal of the sensor, is connected via a loop resistor to the inverting input terminal of the electronic voltage comparator. The output terminal of the electronic voltage comparator is connected to the input terminal of a current amplifier fed from an external voltage source via the second output terminal of the sensor. The output of this amplifier is connected to the inverting input terminal of the electronic voltage comparator so that a current variable as a function of the variable voltage developed by the variable-voltage opto-electronic generator is available across the sensor's output terminal.

The object of the present invention is to provide a light intensity sensor which is free of the drawbacks observed in the operation of a variable voltage opto-electronic generator and preserves the advantages deriving from the use of generators of this type, notably a very satisfactory light detection efficiency, good sensitivity, long life and satisfactory resistance to temperature variations. Other advantageous features result from the fact that the sensor delivers a variable current across its output terminals instead of a variable voltage as in the prior art, the output current not being affected by line resistance, and the radio-electrical interferences having less influence on this variable current than with conventional sensors. Furthermore, the output terminals of the sensor are not polarized insofar as a diode bridge is provided at the sensor output, as permitted in the case of the present invention by the fact that the voltage drop resulting from the presence of this bridge cannot affect the value of the variable current available at the output terminals of the sensor. Any faulty connection of the sensor and consequently any damage to the variable-voltage opto-electronic generator are definitely precluded by the fact that this generator is protected by electronic components, notably by the current amplifier. Moreover, the current delivered to the sensor terminals may be relatively high, so that the means utilized for measuring this current may be relatively simple or less sensitive. Finally, when the light intensity received by the sensor is zero, the sensor still delivers a quiescent current, so that the operator can check at any time whether the electrical connection between the sensor and the measuring instrument is broken or not.

BRIEF DESCRIPTION OF THE DRAWING

The single FIGURE of the attached drawing illustrates in the form of a wiring diagram a preferred form of embodiment of the light intensity sensor according to the instant invention.

DETAILED DESCRIPTION OF A PREFERRED EMBODIMENT

Figure 1:
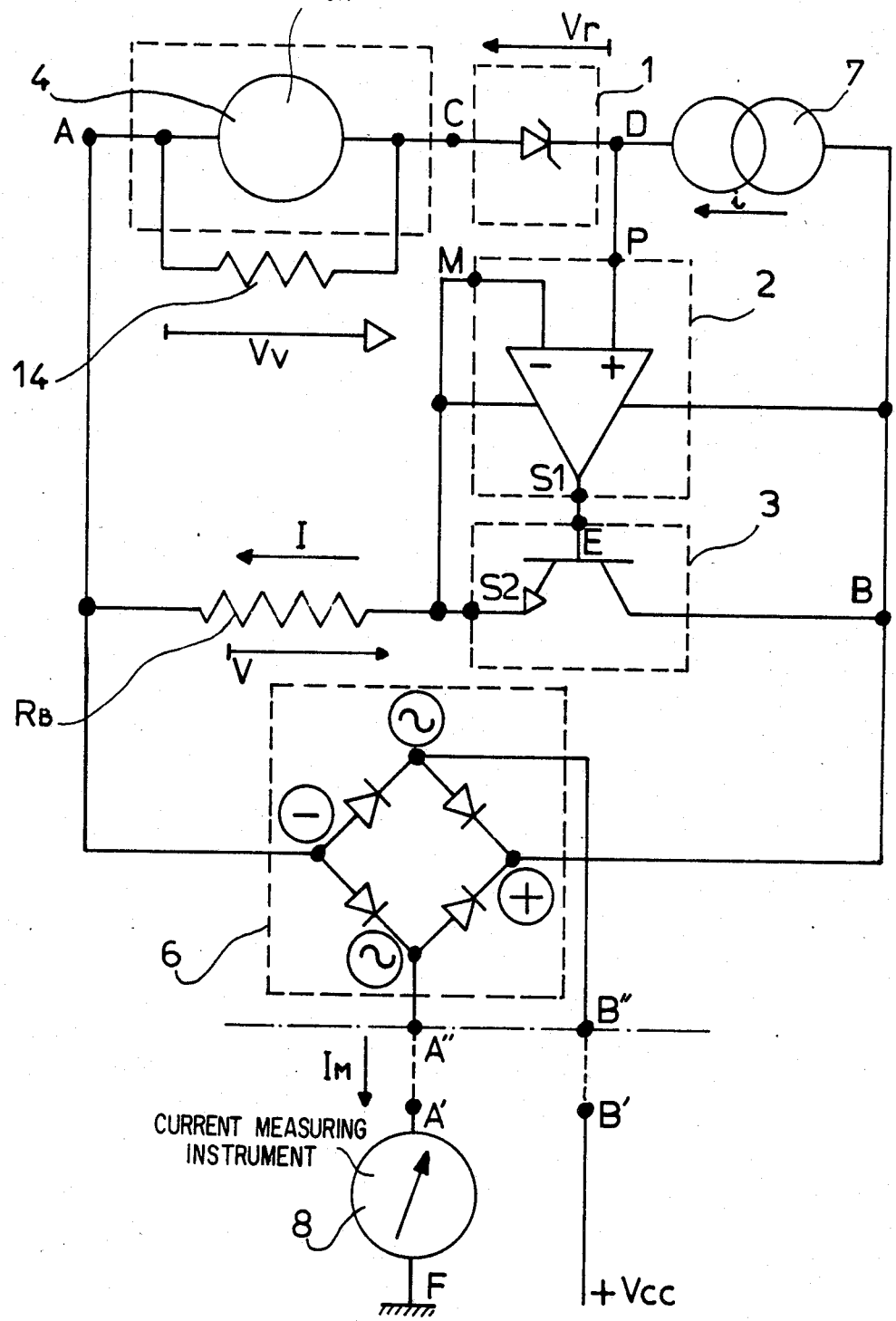

The light intensity sensor illustrated in the drawing comprises a variable-voltage opto-electronic generator 4 connected in parallel to the terminals of a load resistor 14 and a reference voltage generator 1 connected in series to the variable-voltage opto-electronic generator 4 through a first terminal C common to both generators 4 and 1.

The second terminal A of the variable-voltage opto-electronic generator 4, which constitutes the first output terminal of the sensor, is connected via a loop resistor RB to the inverting input terminal M of an electronic voltage comparator 2.

In the preferred embodiment, the reference voltage generator 1 consists of a reference Zener diode having its cathode D connected to the non-inverting input terminal P of the electronic voltage comparator 2 and to a first terminal of a constant current generator 7, generator 7 having its second terminal connected to an external source of voltage Vcc through the second output terminal B of the sensor. This generator 7 is adapted to generate a constant current i.

The electronic voltage comparator 2 consists for example of an operational amplifier having two supply terminals, one of which is connected to an external source of voltage Vcc via the output terminal B and the other of which is connected to its inverting input terminal M. The output terminal S1 of comparator 2 is connected to the input terminal E of a current amplifier 3.

This current amplifier 3 consists for example of an NPN transistor of which the base constitutes the input E, the emitter of this transistor constituting an output S2 connected to the inverting input terminal M, the collector constituting the terminal B connected to the supply Vcc.

The voltage supply source Vcc is for example a source of d.c. voltage connected for instance to terminals A and B via a diode bridge 6. The d.c. voltage supply Vcc comprises an input terminal B' connected through a terminal B'' of the sensor to one of the alternative inputs of the diode bridge 6 via a second terminal A'' of the sensor, to one terminal A' of a current measuring instrument 8 having its other terminal F connected to the negative terminal of supply Vcc. The terminals A and B are connected to the − and + terminals of diode bridge 6, respectively.

When voltage from the supply Vcc is applied to the light intensity sensor according to the invention, the variable-voltage opto-electronic generator 4 delivers a variable voltage Vv as a function of the variable light intensity detected by the sensor to the terminals A and C of load resistor 14. The reference voltage generator 1 delivers a reference voltage Vr to its terminals C and D. The electronic voltage comparator 2 compares with respect to the common point C the sum of voltages Vv and Vr delivered by generators 4 and 1, respectively, with the voltage V applied to the terminals of loop resistor RB. If these two voltages differ, the electronic voltage comparator 2 and the current amplifier 3 react in order to restore the equality between the comparator 2 and amplifier 3. For this purpose, more or less current is applied to loop resistor RB by comparator 2 and amplifier 3 in order to increase or reduce respectively the voltage V across the terminals of loop resistor RB until voltage V equals the sum of voltages Vv and Vr.

When this equality is obtained, the value of the current I through loop resistor RB is calculated according to the formula (Vr+Vv)/(RB), that is, (Vr)/(RB)+(Vv)/(RB). The current IM measured by the measuring instrument 8 is the sum of currents i and I. Consequently, this current $I_M$ is equal to i+(Vr)/(RB)+(Vv)/(RB). However, since current i is very small in comparison with current I, it can be disregarded. Thus, current $I_M$ is for all practical purposes equal to the sum of a fixed current (Vr)/(RB) and a variable current (Vv)/(RB) depending on the sensed light intensity.

Even when the light intensity picked up by the variable-voltage opto-electronic generator 4 is zero, the measured current $I_M$ is not zero but equal to (Vr)/(RB). It is thus possible to ascertain at any time, when voltage from supply Vcc is applied to the sensor, whether the electrical connection between the sensor and the measuring instrument 8 is broken or not.

It will be seen that each terminal A' and B' can be conected at will to one or the other terminal A'' and B'', terminal B' being constantly connected via diode bridge 6 to terminal B, and terminal A' is constantly connected to terminal A. Any faulty connection of the sensor is thus safely avoided.

It is within the scope of the invention to substitute a battery having its two terminals connected to terminals C and P, respectively, for the reference Zener diode (forming the reference generator 1) and constant current generator 7.

The light intensity sensor according to the present invention is applicable notably for controlling the opening or closing of blinds or the like as a function of the intensity of the sunlight received by the sensor.

What is claimed is:
1. A light intensity sensor adapted to provide a variable output current, which comprises:
   an opto-electronic generator having first and second terminals, the opto-electronic generator being adapted to detect light and generate a voltage across the first and second terminals thereof which varies as a function of the intensity of the detected light;
   a voltage comparator, the comparator including an inverting input terminal, a non-inverting input terminal and an output terminal;
   a loop resistor having first and second ends, the first end being electrically coupled to the first terminal of the opto-electronic generator, and the second end being electrically coupled to the inverting input terminal of the comparator;
   a reference voltage generator having first and second terminals and being adapted to generate a reference voltage across the first and second terminals thereof, the first terminal of the reference voltage generator being electrically coupled to the second terminal of the opto-electronic generator, and the second terminal of the reference voltage generator being electrically coupled to the non-inverting input of the comparator; and
   a current amplifier, the current amplifier having an input terminal and an output terminal, the input terminal of the current amplifier being electrically coupled to the output terminal of the comparator, and the output terminal of the current amplifier being electrically coupled to the inverting input of the comparator.

* * * * *